(No Model.) 7 Sheets—Sheet 1.

S. H. TERRY.
TRACTION ROPE RAILWAY.

No. 270,508. Patented Jan. 9, 1883.

Witnesses:
Frank S. Blanchard
Albert H. Adams

Inventor:
Samuel H. Terry
By West & Bond
Attorneys.

(No Model.) 7 Sheets—Sheet 2.

S. H. TERRY.
TRACTION ROPE RAILWAY.

No. 270,508. Patented Jan. 9, 1883.

Witnesses:
Frank S. Blanchard
Albert H. Adams

Inventor
Samuel H. Terry
By West & Bond
Attorneys.

(No Model.) 7 Sheets—Sheet 3.

S. H. TERRY.
TRACTION ROPE RAILWAY.

No. 270,508. Patented Jan. 9, 1883.

Witnesses
Frank S. Blanchard
Albert H. Adams

Inventor:
Samuel H. Terry
By West & Bond.
Attorneys.

(No Model.)  7 Sheets—Sheet 4.

S. H. TERRY.
TRACTION ROPE RAILWAY.

No. 270,508.  Patented Jan. 9, 1883.

Witnesses.
Robert Everett,
J. A. Rutherford

Inventor.
Samuel H. Terry.
By West & Bond,
Attys.

(No Model.) 7 Sheets—Sheet 6.

S. H. TERRY.
TRACTION ROPE RAILWAY.

No. 270,508. Patented Jan. 9, 1883.

Witnesses.
Robert Everett
J. A. Rutherford

Inventor.
Samuel H. Terry,
By West & Bond,
Attys.

(No Model.) S. H. TERRY. 7 Sheets—Sheet 7.
TRACTION ROPE RAILWAY.

No. 270,508. Patented Jan. 9, 1883.

UNITED STATES PATENT OFFICE.

SAMUEL H. TERRY, OF GUTHRIE, MISSOURI.

TRACTION ROPE RAILWAY.

SPECIFICATION forming part of Letters Patent No. 270,508, dated January 9, 1883.

Application filed April 25, 1882. (No model.)

*To all whom it may concern:*

Be it known that I, SAMUEL H. TERRY, a citizen of the United States, residing at Guthrie, in the county of Callaway and State of Missouri, have invented certain new and useful improvements in grippers for cable-way cars and means for governing the cable and operating the grippers, of which the following is a full, clear, and exact description.

This invention has for its objects to provide an improved gripper and means for operating the same; to provide a tramway-car with a gripper composed of two jaws to seize and hold a traveling cable for propelling the car, said gripper being provided with devices whereby it is not only capable of being automatically released and elevated, but is also under control of the operator on the platform of the car, from which point the gripper can also be operated as desired; to provide a gripper which is hinged to its support at a point within the tube or tunnel through which the cable traverses, so that the gripper, while grasping the cable and moving therewith, can swing from side to side as the cable may vary in relation to the line traversed; to provide guards which span the crossing cables or the pulleys so that the grippers are caused to rise and ride over the crossing cable or pulley without danger of falling upon the same; to provide efficient means of detachably connecting the gripper to the car; to provide novel devices for opening and closing the jaws of the gripper to seize and release the cable; to provide novel means for retaining the cable in proper position at the intersection of two tracks; to provide means for swinging the hinged gripper sidewise to bring it in position to engage the cable at curves or bends, and to provide for deflecting the cable at different points to keep it taut and take up the slack, and at the same time permitting the cable to yield when seized by the gripper, thereby avoiding danger of breakage by relieving the cable of too sudden strains. The invention has other objects which will be hereinafter referred to. These objects I accomplish by the mechanisms and devices illustrated in the accompanying drawings, in which—

Fig. 12$^a$, a view showing the gripping devices, gripper-plate, hollow head or socket, and rotating head all detached and in perspective, to more clearly show the details of construction.

In order to enable others skilled in the art to make and use my invention, I will now proceed to describe the same in detail, reference being had to the accompanying drawings.

Figure 1:
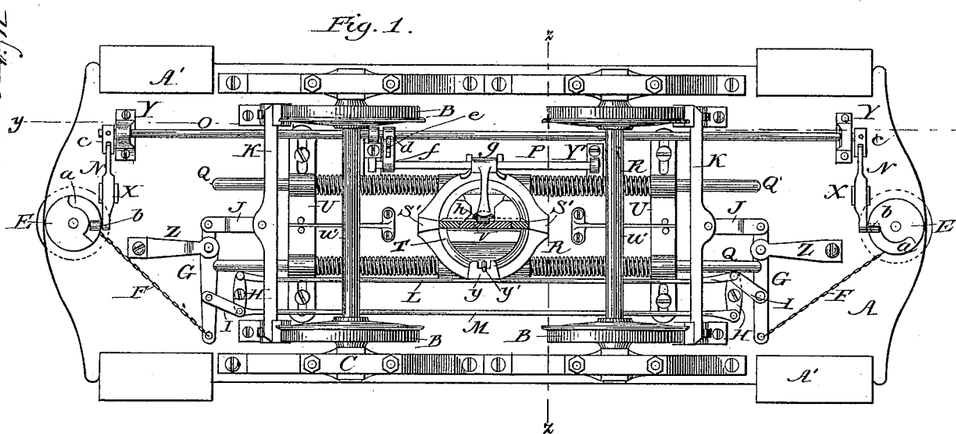
Figure 1 is a plan view of the bottom of a car, showing my gripper applied thereto.
Figure 2:
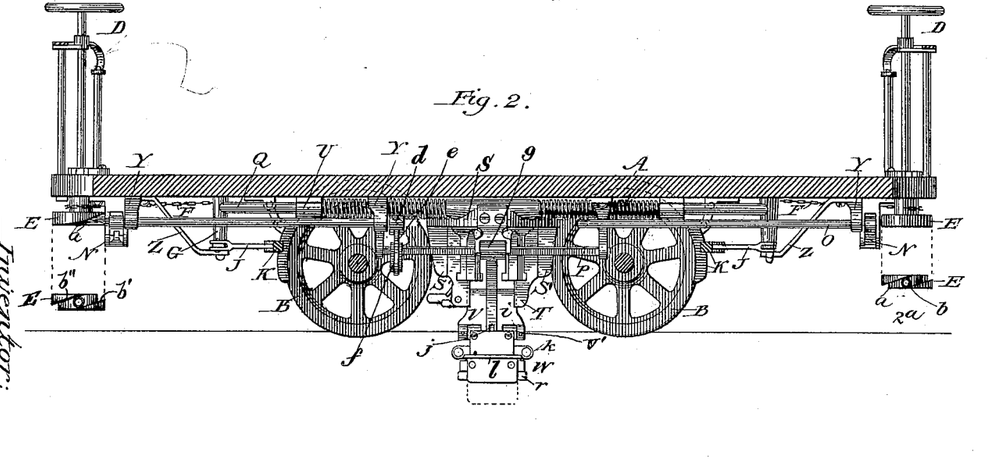
Fig. 2, a longitudinal sectional view on the line $y$ $y$ of Fig. 1.

The first two figures of the drawings illustrate means for operating the gripper and the car-brakes from the head E on the hand-wheels or crank-shafts D of the car, the said heads being cut away to form double cams $a$, which operate on the pins $b$ of pivoted levers N, so as to raise or lower the inner ends of the levers, according to the direction in which the heads are turned. The other ends of the levers are pivoted to arms $c$ on a horizontal rock-shaft, O, which extends the length of the car, and is supported by brackets Y, attached to the car-bottom A. The shaft O carries an arm, $d$, which connects by a link, $e$, with an arm, $f$, on the rock-shaft P, supported by brackets Y', and carrying an arm, $g$, which connects with a projection, $h$, on the gripper-slide, all in such manner that when one of the hand-wheels or crank-shafts D is turned the brakes are applied, the gripper-jaws are opened to release the cable, and the gripper is raised. These features, except in certain devices hereinafter claimed, constitute the subject-matter of a separate application for Letters Patent, and therefore it is not essential to more fully describe them in this case.

Figures 6, 7, 8, 9, 10, 11, 12:
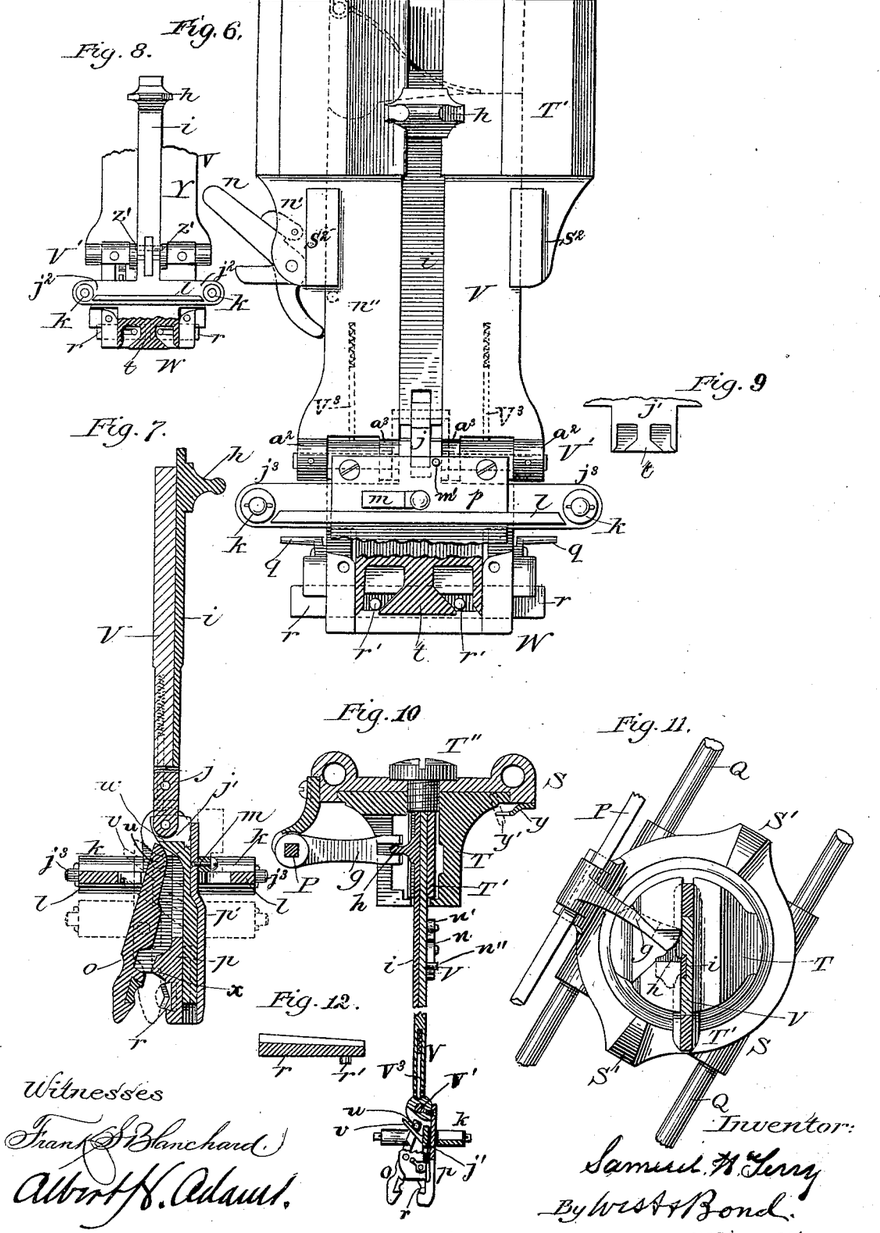
Fig. 6, a side elevation of the gripper, the lower part being in section.
Fig. 7, a vertical cross-sectional view of Fig. 6.
Fig. 8, a broken elevation, showing the opposite side of the gripper from that shown in Fig. 6.
Fig. 9, a detached view of the slide-plate.
Fig. 10, a cross-sectional view of the gripper devices, showing the arm which actuates the gripper-slide.
Fig. 11, a plan view, partly in section, showing the upper end of the gripper, the gripper-blade being in position to be detached from its support.
Fig. 12, a sectional view of one of the gripper-wedges.

The gripper-head S is constructed, as shown in Figs. 1, 10, and 11, with collars or tubes, through which pass horizontal parallel rods Q Q, said head being fixed to the rods and having on its under side a downward projection to form a circular seat to receive the rotating gripper-head T. The rods Q are cylindrical and attached to the bottom of the car by plates U, having suitable passages or boxes through which the rods pass, such plates having slotted ends, so as to permit the car to have sidewise movements; and such plates are normally held in line or returned to their proper relative position, when thrown out of line, by the springs $u'$, secured to the car at one end and operating on the plates at the other end by means of pins. (See Fig. 1.) This arrangement permits the car-body to move sidewise, so that if the rails of the track should get out of line with relation to the gripper-opening 2 in the cable tube or tunnel the car-body may move or oscillate sidewise to accommodate itself to the trackway, while the gripper-head and gripping devices are retained in vertical line, or approximately so, with the line traversed by the cable. As each plate has an independent endwise movement, they may move in opposite directions to ease the gripper in passing curves, so that a wide gripper-blade can be used. The spaces along the rods between the plates U and head S are occupied by helical or other springs, R, the object of which is to relieve the gripper in the act of starting or stopping a car. The head T of the gripper is adapted to rotate in the fixed head, being confined in position by a central screw, T'', and the gripper-blade V is connected at its upper end with the rotating head in any suitable manner; but in order to provide for the automatic detachment of the said blade and the gripping devices carried thereby (which gripping devices will be hereinafter described in their order) I connect the blade with the head T in the following manner: The head is constructed with a transverse slot or passage, in which is loosely arranged a hollow head or socket, T', which receives within it the upper end of the gripper-blade, which is free to rise and descend in the hollow head or socket, but whose descent is limited by a pin and a lever, as hereinafter explained.

The sides of the fixed head S, which stand in the direction of the ends of the car, are provided with depending bracket-arms S', which are arranged centrally with relation to the length of the car, said arms serving as abutments for the ends of the hollow head or socket T' so long as the ends of the latter and the depending bracket-arms stand in line, or substantially so, with the line of the cable; but if one end of the car is derailed it is swung around, carrying with it the depending bracket-arms, thereby taking them out of line with the slot in the head T and the ends of the hollow head or socket T', so that the latter is free to slide from the slotted head, carrying with it the gripper-blade and its attached gripping devices. This is very important should an accident occur, for the reason that if one end of the car should jump the track, instead of the car being drawn off in such position, the gripping devices are automatically detached in a rapid and effective manner.

A limit-stop for the rotating head T is provided, which is composed of a slotted or forked plate, $y$, attached to the head S, and a pin, $y'$, secured in the head T in the fork or slot, the object of which is to limit the rotation of the head T in the head S. Such stop is not essential where the gripper runs in a slit in a tube or tunnel; but when the gripper is used on a cable arranged above ground the limit-stop is very essential to prevent the head T from rotating sufficiently to let the gripper slip out. The hollow head or socket T' is provided at each end with a downward extension, S², Fig. 6, for sustaining the edges of the gripper-blade V, and to one of the extensions S² is pivoted a lever, $n$, one end of which extends so as to rest against one side of the gripper-blade, and is held in such position by a pivoted pawl or dog, $n'$. A pin or projection, $n''$, is so attached to the gripper-blade that when the lever $n$ is locked it forms, in connection with the pin, a stop to limit the descent of the gripper-blade; but if the pawl or dog $n'$ is adjusted to release the lever $n$, as in Fig. 6, the blade and the attachments which it carries, as hereinafter explained, may be drawn down and detached from the car. The blade is vertically grooved to receive a slide, $i$, such slide projecting down from the blade a sufficient distance to bring the gripper W in proper relation to the cable.

Figures 3, 4, 5:
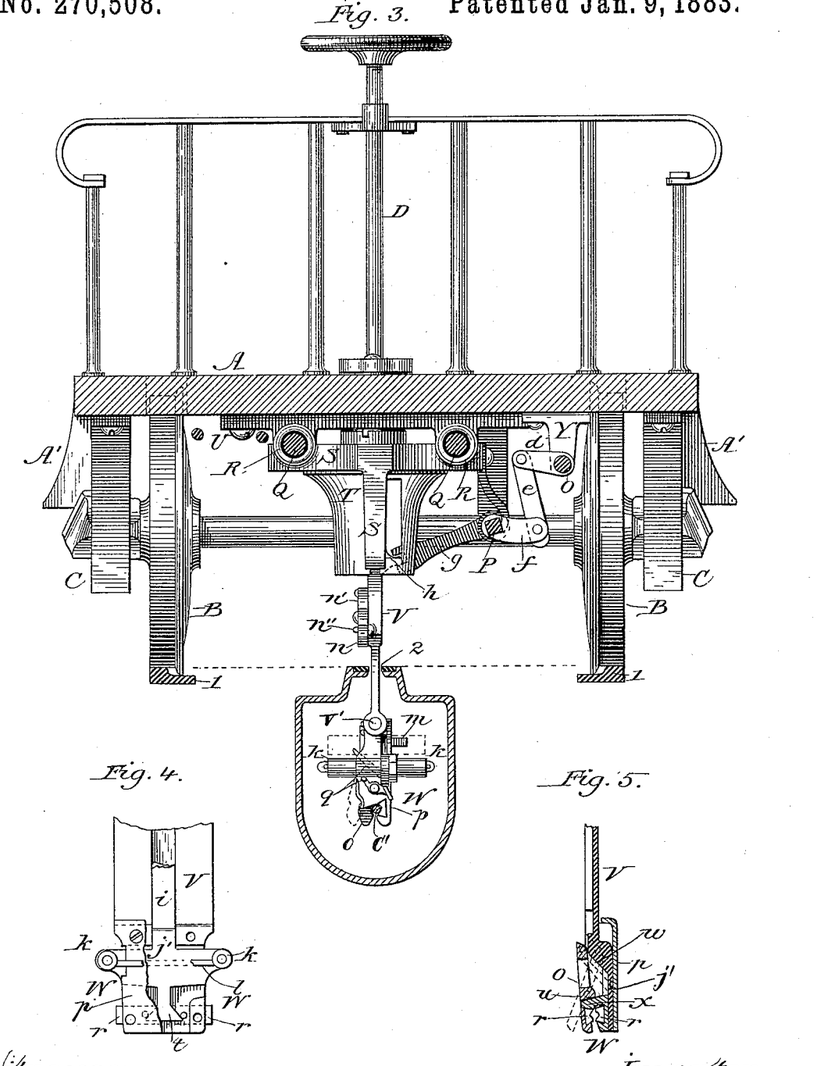
Fig. 3, a transverse sectional view on the line $z$ $z$ of Fig. 1, showing also a section of the cable-tube.
Fig. 4, a broken side view of one form of the gripper.
Fig. 5, a vertical sectional view of Fig. 4.

If the gripper is to be used on a straight line, it may be made without a joint between the blade V and the gripper W, as shown in Figs. 4 and 5; but when used on lines having curves or switches, I provide a joint, V', which may be formed in any suitable manner; but, as here shown it is formed by outer eyes, $a^2$, and inner eyes, $a^3$, on the gripper-blade, into which set eyed projections $a^4$ on the gripper, (see Fig. 12ª,) the parts being held together by two independent pintles, $a^5$. The adjacent sides of the inner eyes, $a^3$, on the gripper-blade are provided with grooves $a^6$, in which are arranged lateral projections $z'$ $z'$, at the edges of the lower end of the slide $i$, whereby the latter is held in position and properly guided at this point and prevented from springing or moving outward when the gripper is turned on its joint to operate at an angle. The lateral projections $z'$ are formed as shown by extensions of a pin which serves as a pivot for the link $j$, which connects the slide to the moving plate $j'$ of the gripper. The moving plate $j'$ works vertically between the back plate, $p$, and the pivoted plate $o$, the former plate being the one which is jointed to the gripper-blade. By the link-connection of the slide $i$ with the moving plate $j'$ the gripper can be operated when turned at an angle of nearly or quite forty-five degrees, or until the upper one of the pivots of the link $j$ passes outward beyond the joint or hinge $V'$. Further, the gripper can be caused to grasp or release a cable on curves and in other positions when the cable is out of line with the gripper-opening in the cable tube or tunnel; and, further, the gripper is prevented from drawing against the side of the gripper-opening when the cable is out of line, which is important in turning curves or bends. As the gripping jaws or plates $o$ and $p$ will usually, or for a great portion of the time, work in a vertical line with the gripper-blade V, I provide a stop or spring-catch, $V^3$, (one or more,) Figs, 6, 10, and 12$^a$, arranged in or on the gripper-blade and adapted to engage a recess in the eyed projections $a^4$ of the plate or jaw $p$, so as to lock the gripper blade and the jaws together and retain them in a vertical line, the construction of the stop or spring-latch being such that it will disengage itself from the eyed projections and release the jaws under slight pressure exerted sidewise on the latter. The eyed projections $a^4$ are provided with a series of recesses around them for the purpose of locking the gripper at any angle to which it may be adjusted relative to the gripper-blade.

Figure 12A:
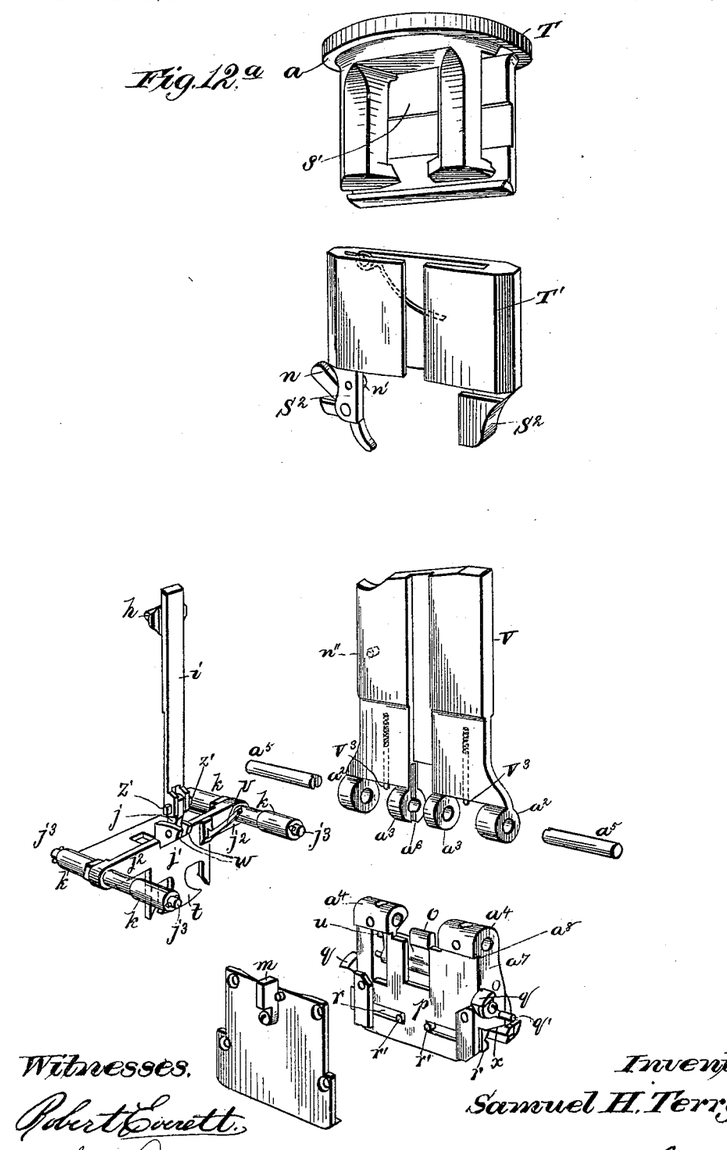

The plate $p$ has at each end a wall, $a^7$, which serve as a bearing for the pivots of the plate $o$, which pivots are arranged about midway the length of the plate, and the plate has on its inside a projecting stop, $x$, Fig. 7, to prevent the cable from getting up too far between the jaws of the gripper, which jaws are formed by the plates $o$ and $p$. This limit-stop $x$, instead of being between the jaws and inside thereof, as in Fig. 7, may be formed by the lower ends of the wall $a^7$ of the back plate, $p$, as in the gripper W. (Shown in Fig. 12$^a$.) The lower end of the jaw formed by the plate $p$ is provided with two wedges, $r$, which extend transversely across the jaw, and are retained in proper position by a dovetailed groove, the latter having at the center a stop which limits the inward movement of the wedges; but such stop may be omitted, as the pins $r'$, fixed to the inner ends of the wedges, will act as stops in connection with the double incline $t$ on the lower end of the moving plate $j'$. This double incline works between the pins $r'$, Fig. 6, and serves to throw the wedges outward when the double incline is raised by the vertical movement of the plate $j'$ and slide $i$. The wedges $r$ are held in their outer positions, to prevent their being accidentally slipped inward, by means of weighted latches $q$, which are pivoted to the end walls of the plate $p$, such latches, when the plate $j'$ and slide $i$ are elevated, dropping into notches in the wedges, so that they cannot accidentally be moved inward. When the plate $j'$ is depressed the upper projection of the latches come in contact with the rollers $k$, carried by the plate $j'$, which withdraws the latches from engagement with the wedges, thereby leaving one of the wedges free to be moved inward by the friction of the cable, so as to cause the jaw to firmly bind and clamp the same.

While I have shown and described a double incline, $t$, for effecting the outward movement of the wedges, I do not confine myself thereto, as other mechanical contrivances can be used to effect the same purpose by the vertical movement of the plate $j'$ and slide $i$.

In operation, when the gripping-jaws embrace and seize the cable one of the wedges will be drawn inward by frictional contact with the cable, the other wedge, remaining in the outer position to which it has been adjusted by the rising movement of the double incline, so that the gripping-jaws can be operated and assisted in the gripping action, no matter in which direction the car travels. It should be stated that the idle wedge will not be thrown outward so far as to cause only half of the gripper to work, as the arrangement is such that the gripping jaws will grasp the cable their full width. The two sliding wedges, carried by a single jaw, permits the car to be run in either direction, one wedge sliding inward when the car moves in one direction and the other wedge sliding inward when the car moves in the opposite direction.

The jaw or pivot-plate $o$ is provided with a concavity opposite the wedges for fitting against or around the cable, and this concavity is preferably formed in a piece detachably fitting a dovetail groove in the jaw, so that it can be replaced by a new one, thus avoiding renewing the entire jaw. At the upper end of one of the side edges of the jaw $o$ is a lateral pin, $u$, against which operates a horn or cam, $v$, fixed to the sliding or moving plate $j'$, so that when the said plate is lifted by the slide $i$ the horn or cam bears against the pin $u$, which causes the upper end of the jaw $o$ to move inward toward the plate or jaw $p$, thereby opening the said gripping-jaws. The upper end of the plate $j'$ is provided with a cam or inclined projection, $w$, which acts on the upper end of the jaw $o$, so that when the said plate is depressed by forcing the slide $i$ downward the lower end of the said jaw will be thrown inward toward the plate or jaw $p$ for embracing and grasping the cable. The cam or incline w, when down between the upper portions of the two jaws, serves to hold the latter in a closed position and firmly and rigidly against the cable. The cam or incline w, for closing the hinged or movable jaw o, may be a centrally-located one, as in Fig. 5; or two cams can be employed, as in Fig. 12ª. I do not, however, confine myself to the particular devices shown for opening and closing the jaws, as other means will readily suggest themselves.

To the back of the plate or jaw p is pivoted or hinged one end of a stop or plate, m, the object of which is to operate switch-levers when branches or connecting-lines are used, said stop or plate standing in a horizontal position, as in Fig. 6, when the car travels on a line having no switches or branches; but where a switch-lever is to be operated the stop or plate is turned to a vertical position until it rests against a stop, m', as in Fig. 6. I have illustrated but a single stop or plate, m, for operating the switch-levers; but in order that the same car may be used on other connecting-tracks for special occasions I will provide another stop or plate on the opposite side, so as to operate switch-levers from either or both sides. If occasion demands, or if the cable-way has a considerable space above the cable, the stop or plate m, or two of them, can be placed on the gripper-blade V above the joint V'. The switch devices form the subject-matter of a separate application for Letters Patent, and are therefore not here shown and described.

The plate j' is provided at each side with an arm, j², which projects outward beyond the gripper-jaws or plates, each of said arms carrying a journal or stud, j³, on which is arranged rollers or wheels k, which are designed to come in contact with and ride up and over guide-guards, as hereinafter explained, for the purpose of automatically lifting and carrying the gripper over a crossing cable or any obstruction. The object of the rollers is to ease the gripper in being lifted by and riding over the guide-guards, and thereby avoid injury to the gripping-jaws and their operating mechanism.

A horizontal plate, l, is located between the rollers k on the outside of each of the jaws or plates, such horizontal plates being attached to and moving with the sliding plate j', their object being to prevent the rollers k from dropping into the space between the guide-guards, hereinafter described.

The upper end of the slide i is provided with an attached laterally-projecting stud, h, with which engages the bifurcated inner end of an arm, g, the outer end of which is fixed on the rock-shaft P, so as to rock with the latter to raise the gripper, said arm, however, being adapted to slide longitudinally along the said rock-shaft to permit it to partake of the longitudinal movements of the head S, heretofore described. The arm g projects through a vertical slot, s', in the rotating head T for engaging the stud h on the slide and permitting such arm to swing in a vertical plane.

In the practical use of the invention the weight of the gripping-jaws and their concomitants will be found sufficient to keep the jaws in their lower or depressed position to embrace and grasp the cable; but, if essential, a spring may be arranged in the hollow head or socket T', as indicated by dotted lines, Figs. 6 and 7, so as to act against the upper end of the gripper-blade V, so as to insure the depression of the gripper-blade with the slide i, and thus effect the proper opening and closing of the jaws.

In operating the gripper, but one of the hand-wheels or crank-shafts D is used at a time, the opposite one being locked by the usual pawl and ratchet-wheel or other suitable devices; and when locked the head E of the shaft should be in the relation to the pin b shown at 2ª, Fig. 2, which position permits shaft O to rock freely, while if this head E were turned to its limit in either direction and then locked the shaft O would be fastened; and, to prevent tampering with the locked head, there may be provided but a single hand-wheel or crank for the two shafts, the operator changing it from one shaft to the other, as required. By turning the unlocked hand-wheel or crank-shaft in the proper direction—that is, to the right—the head E will be revolved to cause the pin b to rise up under the action of the incline b' of the head, thereby raising the inner end of the lever N and depressing the outer end thereof, which, through its connection c, rocks the shaft O in its bearing, which latter transmits a rocking motion to the shaft P through the connection formed by the arms d and f and link e, such rocking of the shaft P causing the arm g to swing upward, and by its connection with the stud h on the slide i raises the latter and elevates the plate j', and causing its horn or cam v to act on the lateral pin u on the edge of the jaw or plate o, swinging the latter on its pivot and throwing its lower end away from the jaw or plate p, thereby releasing the grip on the cable. A continued rotation of the head E causes the plate j' to rise and come against shoulders a⁸ on the gripper W, thus lifting the gripper-blade and elevating the gripper-jaws away from the cable, which permits the gripper to pass a crossing cable or any obstruction, such as a pulley at a switch. As the jaws commence to open, the sliding plate j', through the double incline t, acts on the pins r' of the wedges r, and throws them outward to the position shown in Fig. 6, so as to be in readiness to act on the cable when the gripping-jaws are lowered. The hand-wheel or crank is released at the proper time, when the weight of the jaws and their concomitants will cause them to fall into such position that the cable will enter between the jaws. The hand-wheel or crank is now turned to the left, which causes the incline b'' of the head E to act on the pin b and depress inner end of the lever N, thus imparting movements to the rock-shafts the reverse of those above mentioned for raising the slide $i$. Hence this slide will be depressed, and with it the plate $j'$, the cam or incline $w$ at the upper end of the latter acting to throw the upper end of the jaw or plate $o$ outward and its lower end inward, thereby causing the jaws to grasp and hold the cable, one of the wedges being drawn inward by contact with the cable, thereby materially assisting in the gripping of the same.

The car-bodies are usually supported by springs, and hence it is essential to permit the car-body to rise and fall without raising or lowering the grip in relation to the cable. This is accomplished by the loose connection of the gripping-plate V and the hollow head or socket T'. Thus, when the gripping-jaws grasp and hold the cable the car can move vertically by reason of the hollow head or socket sliding up and down on the upper end of the gripper-blade. This vertical movement of the car and the hollow head or socket T' on the gripper-plate, without disturbing the relation of the gripping-jaws and the cable, is rendered possible, owing to the shafts O and P being free to rock and the lever N and arm $g$ free to swing to a limited extent when pin $b$ of the lever N is not actually held or locked in a fixed position by the inclines of the head E. The gripper-blade, when the gripping-jaws grasp the cable, does not reach the top of its holding head or socket T', but occupies the relative position to the latter shown by the dotted lines, Fig. 6, which position may be varied by setting the pin $n''$ higher or lower, so that the gripper-blade has or may have a vertical movement equal to the distance shown in said figure between the dotted line and the upper end of the hollow head or socket, which distance must be such as to permit the gripping-jaws to rise sufficiently to pass a crossing cable or other obstruction.

It will be obvious from the foregoing that by providing a loose connection between the gripper-blade and the car-body the latter can freely rise and fall without imparting corresponding movements to the gripping-jaws and gripper-blade. Hence the cable will never be "kinked" or strained, as is the case with a gripping device fixed in relation to the car.

The mechanism above described is for operating the gripper from the platform of the car; but the gripper is adapted to be raised by devices on the cable-way for the purpose of automatically lifting the gripper over a crossing, a pulley, or any obstruction. To accomplish this I provide the guide-guards B', of the form shown in Figs. 14, 15, and 18. Such guards have a space, B², between them to permit the passage of a gripper at a crossing. These guide-guards are supported by suitable cross-ties, and are inclined upward at each end from a point a little below the cable C', (see Fig. 18,) and they are located at every place where it is essential to raise the gripper to pass an obstruction. For example, they are placed where a crossing occurs to lift the gripper over the crossing cable, as shown in Fig. 18; at a switch to lift the gripper from one cable to the other, as shown in Fig. 15; at places where the gripper is to be lifted over a pulley, as in Fig. 15, and over the cable-tighteners, hereinafter described, as shown in Fig. 18, to lift the gripper over a crossing cable when such occurs at the point where a cable-tightener is located.

In operation, supposing the gripping-jaws embracing and grasping the cable, and they come to the guide-guards B', the rollers or wheels $k$ will ride up the inclined ends thereof, and in rising they raise the plate $j'$ and open the jaws to release the cable, at the same time moving the gripper-blade upward in its hollow head or socket T' and holding the parts in this position until the rollers or wheels leave the guide-guards, when the gripper blade and jaws will descend by gravity or under the influence of the spring, hereinbefore mentioned. After the descent of the gripper the hand-wheel or crank-shaft is operated to close the jaws on the cable, as hereinbefore explained. In lieu, however, of operating the hand-wheel or crank-shaft to close the jaws each time the gripper leaves the guide-guards, I may provide an inclined plate or guide to act on the upper sides of the rollers $k$ as they leave the guide-guards, so as to depress said rollers, and with them the plate $j'$, thereby automatically closing the jaws onto the cable.

Figures 13, 14, 15:
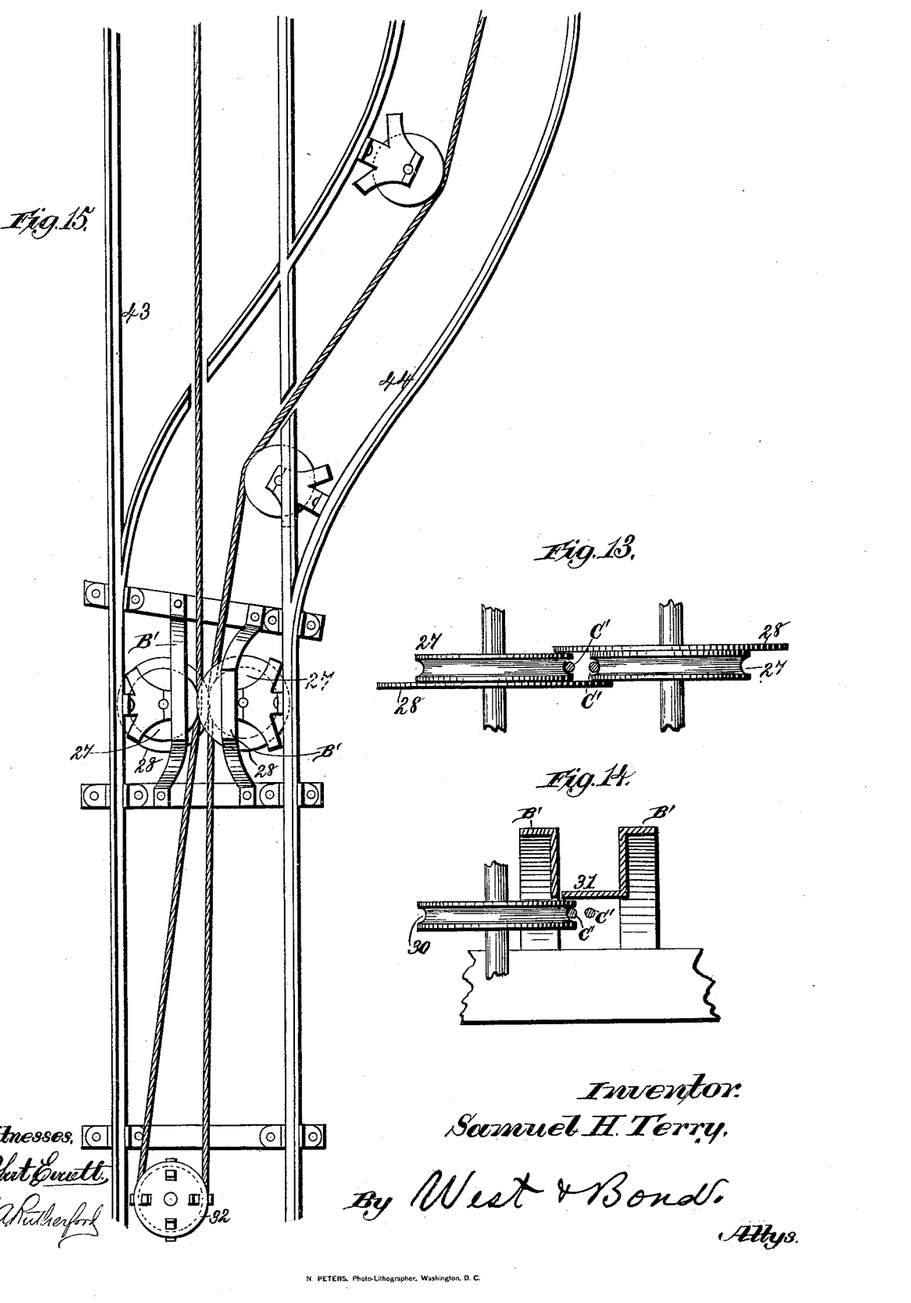
Fig. 13, a side view, showing the manner of holding the cable for a switch intersection or end turn.
Fig. 14, a modification of the devices shown in Fig. 13.
Fig. 15, a plan view of one end of the track and switch intersection, the surface works being omitted.
Figure 16:
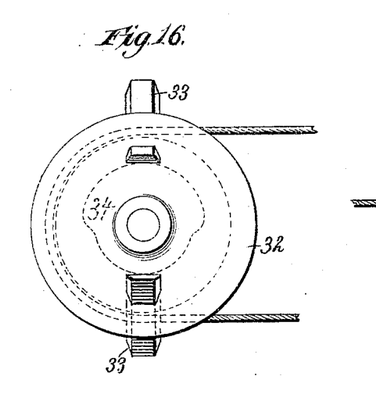
Fig. 16, a plan view of a grooved friction-wheel for operating a cable of uniform diameter.
Figure 17:
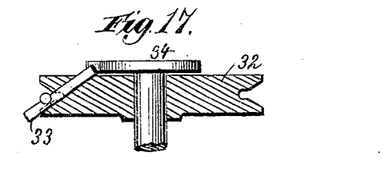
Fig. 17, a central sectional view of the wheel shown in Fig. 16.

In Figs. 13 and 14 I have shown the pulleys for supporting and retaining the cable in proper position at a switch or intersection. The cable C' is carried between the two wheels 27 and around the wheel 32, the wheels 27 being provided respectively with a top and a bottom disk or flange, 28, which respectively project over the wheels, and thereby securely retain the cable in the grooves of the wheels. Instead, however, of using two wheels, 27, at the switch I may use a single wheel, 30, (see Fig. 14,) in which event a horizontal flange, 31, on one of the guide-guards B' projects over the edge of the wheel and prevents the cable from rising off the wheel. The wheels 27 are located at or near the end of a double track, or at a point where it is desired to change a car running in one direction to the other track to run in another direction.

Figure 18:
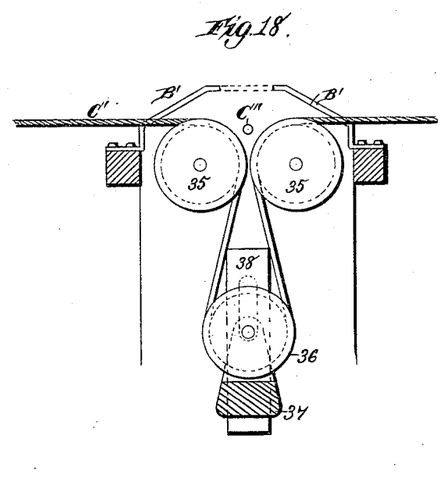
Fig. 18, an elevetion of the devices for deflecting the cable, keeping it taut, and taking up slack.
Figure 19:
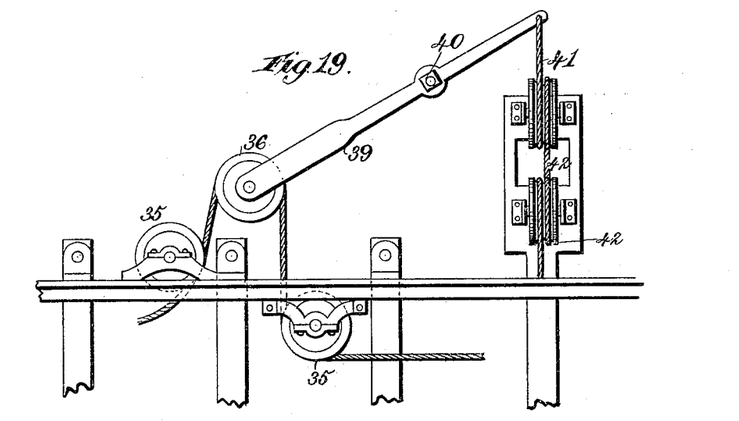
Fig. 19, a plan view showing a modification of the devices for deflecting and keeping the cable taut.

In Figs. 18 and 19 I have illustrated the devices for deflecting and tightening the cable, taking up slack, and avoiding strain on the cable in starting a car. At suitable points along the length of the line I arrange a well or depression below the track, and arrange therein near the top two adjacent idler-pulleys or grooved wheels, 35, which may be of any desired size, and are arranged to rotate on a plane with the cable. Under the wheels 35 is arranged a grooved wheel, 36, which has attached to its shaft a weight, 37, and is supported in suitable standards or uprights, 38, each having a slot to allow vertical play of the shaft of the wheel 36. The cable is deflected into the well over the wheels 35, and thence passes around the wheel 36, and by means of the loose arrangement of the latter and its weight the cable will be kept taut and all slack is taken up. At the same time it permits the cable to yield when grasped by the gripping-jaws to start a car, thereby avoiding undue strain. As represented, the well or depression is located at a crossing cable, C″, and hence the deflection of the cable C′ at this point avoids the necessity of lifting the gripper so high at this crossing in order to pass the cable. The wheels 35 and 36 may be of any desired size, and any suitable distance apart, and the size of the well or depression is not material, so long as it is sufficient to allow the wheel 36 and weight 37 perfect freedom of movement in a vertical plane. This arrangement of tighteners, located in a well or pit, is designed for use where the space is limited and the tightener has to be located beneath the trackway; but where there is sufficient room an arrangement for tightening purposes like that shown in Fig. 19 may be used, in which one of the wheels 35 is located outside of the track and the other wheel 35 inside, both wheels having their respective shafts or journals supported in suitable bearings attached to the girder or otherwise, and the wheel 36 is mounted in one end of a lever, 39, which lever is pivoted in any suitable manner, as at 40, so as to be free to swing horizontally, and has attached to its other end a rope, 41, which rope passes over pulleys 42, and carries a suspended weight in a similar manner to that shown in Fig. 18; or the rope might pass over one pulley and the weight be attached directly to its end instead of to a lower pulley, as shown in Fig. 18.

The operation is essentially the same as that described for the tightener in Fig. 18, the lever 39, under influence of its weight or spring, turning on its pivot and carrying the wheel 36 in or out, as required, for the running of the cable, such movement of the wheel 36 drawing the cable taut and taking up slack, as occasion demands.

In place of a weight and pulley, as shown in Fig. 18, or a single pulley and weight, a spring could be used to operate the lever 39, and allow it to swing to conform to the demands of the cable.

The wheel 32 is located beyond the wheels 27 a distance sufficient to take the length of the car or train, and is arranged in such relation to the wheels 27 as that its inner periphery will be nearly central with the opening between the wheels 27, so that the cable for the track on which the transfer is to be made will be carried over to one side and around the pulley, bringing the side of the cable for the track on which the car is to run in line with the slot of the track from which the transfer is to be made, so that the gripper can be made to take hold of the cable passing down the other track, as shown in Fig. 15. It is to be understood that the wheels 27 and 32 are to be arranged to suit the place where the transfer is to be made, and may be varied somewhat from that shown in Fig. 15, so long as the arrangement is such as to bring the cable for the track on which the car is to be run in position to be grasped by the gripper. The wheel 32 is carried by a vertical spindle or axis supported in any suitable manner, and guards B′ are to be provided to raise the gripper over the wheels 27.

The operation is as follows, reference being had to Fig. 15: The car on the track 43 at the end of the line is to be transferred to the track 44, to run in the opposite direction. The car, as it passes down the track 43, has the gripper raised by the guards B′ passing over the wheels 27 into the space between the said wheels and the wheel 32, bringing the gripper into position to grasp the cable of the track 44, and this cable, moving in an opposite direction from the cable of the track 43 as it is grasped by the gripper, starts the car in opposite direction, passing it over the guards B′, raising the gripper, and onto the cable of track 44, it being understood that a switch or frog-plate is properly arranged to transfer the car onto the track 44. A similar arrangement with the wheels arranged for the track 44 to pass the car onto the track 43 is to be provided at the opposite end of the line or on the track 44 at any point where the transfer is desired.

The grooved horizontal wheel 32 is adapted to receive and carry the cable, and it is provided with slides 33, standing at an angle with the groove for the cable. The number of slides requisite depends on the size of the wheel, and they are so arranged as to have a sliding movement sufficient to allow the cable to run clear or be impinged by the slides. Each slide has a transverse notch or recess of sufficient depth to partially inclose the cable and insure engagement of the slide therewith. The slides are operated by a stationary cam, 34, so arranged as to project them successively and allow them to be moved back when clear of the cam. This provides a positive grip for the cable between the slides and the opposite side of the groove, and if the cable is smooth it is prevented from slipping in the groove of the wheel.

The cable C′ for propelling the cars lies in a tube or tunnel longitudinally under the railway-track midway, or nearly so, between the rails 1 1, (see Fig. 3,) and at intervals along its length it is supported by grooved pulleys or wheels arranged on spindles or axes. In this class of cable systems for propelling cars when the gripper engages the cable to start a car the former is strained in one direction, thereby causing a slack in the other direction. This slack continues along the length of the line and permits the cable to violently vibrate, which results in considerable damage, in that the supporting pulleys or wheels are fractured and require frequent renewal. So far as I am aware, such cables have never been provided with means whereby they are kept taut throughout their length, and any slack occasioned, as above mentioned, automatically taken up, thereby preventing the cable from violent agitation, and at the same time permitting it to yield longitudinally to ease the gripper when engaged with the same to start a car. The provision of my cable deflectors and tighteners accomplishes the above important results, and is a part of the present invention, which renders the cable system perfect in operation when employed in connection with the gripper on the cars and means for lifting the grippers over crossings and other obstructions.

I do not confine myself to the particular means shown and described for automatically taking up the slack, keeping the cable taut, and permitting it to yield longitudinally to ease the gripper when it engages the cable to start a car, as other mechanism or devices will suggest themselves for effecting the objects mentioned.

Figure 20:
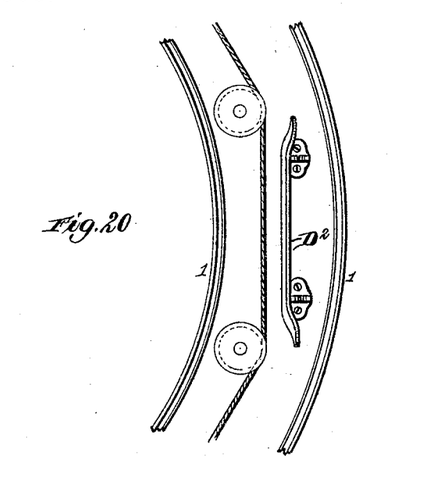
Fig. 20, a plan view showing the guard which swings the hinged gripper-jaws sidewise at a curve or turn in the trackway, so as to bring the jaws in position to seize the cable.
Figure 21:
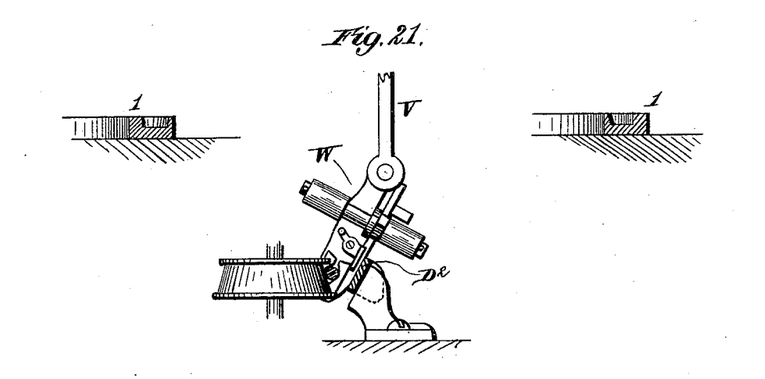
Fig. 21, a section of the guard shown in Fig. 20 with the gripper in outline and swung sidewise to bring it in position to seize the cable.

In turning a curve or bend the cable at the intervals between its supporting pulleys or wheels travels out of a central line relative to the two tracks 1 1, and therefore the hinged gripper can swing sidewise to accommodate itself to the varying line of travel of the cable, which is a very important feature. When the gripper is released from the cable at a bend or curve it could not again be caused to engage the cable without some special provision for this purpose. An efficient means of accomplishing this object is shown in Figs. 20 and 21, where an inclined guide, $D^2$, is arranged parallel, or approximately so, at the points where the cable deflects from a central line relative to the tracks. This guide serves to swing the hinged gripper inward, so as to bring it in line with the cable to insure the proper engagement of the gripper with the same.

The provision hereinbefore described, whereby the gripper-blade can be dropped from its hollowed head or socket, so as to detach it from the car, permits the devices to be attached directly to passenger-coaches, and the facility with which the gripper can be detached permits the car to be used on a road where it is propelled partly by a cable and partly by horses, so that the same car can be used either as a cable or as a horse car, or as both.

Having thus described my invention, what I claim is—

1. A cable-way car provided with a gripper capable of rising and falling in a vertical plane, and composed of opening and closing jaws and laterally-projecting rollers located above the lower edges of the jaws for riding over gripping lifting guide-guards, and means connected with the rollers to automatically open the jaws and release the cable when the rollers ride over the guide-guards, substantially as described.

2. The combination, with a cable-way car, of a gripper capable of rising and falling in a vertical plane and to engage and disengage the cable, mechanism connected with the gripper and under control of the operator from the platform of the car for operating it to disengage and engage the cable and rise and fall, and rollers carried by the gripper to ride over guide-guards and connecting with the devices which operate the gripper, whereby the latter can be automatically disengaged from the cable and raised above the same, substantially as described.

3. The combination, with opening and closing gripper-jaws, of a plate carrying rollers which extend laterally from the outside of the jaws above their lower edges, and adapted to ride over guide-guards to lift the gripper-jaws and automatically open them to release the cable, substantially as described.

4. The combination, with a cable-way having a gripper-lifting guide-guard and a cable, of a gripper and a plate carrying rollers which extend laterally from opposite sides of the gripper above its lower edge to ride over the guide-guard, whereby the lifting of the gripper by the rollers releases it from engagement with the cable, substantially as described.

5. The combination, with a gripper-blade, of a cable-gripper having a hinged connection with the lower end of the blade, which permits such gripper to swing sidewise to either side of the blade while locked in engagement with the cable, substantially as described.

6. A gripper for cable-way cars, composed of a gripper-blade having at its lower end two jaws which open and close, and having a hinged connection with such blade which permits the two jaws to freely swing sidewise to either side of the gripper-blade while such jaws are locked in engagement with a traveling cable, substantially as described.

7. A gripper for cable-way cars, composed of a gripper-blade or other support, gripping-jaws having a hinged or jointed connection therewith and capable of swinging sidewise while in engagement with a cable, and means for lifting the blade or other support and opening the jaws, substantially as described.

8. A gripper for cable-way cars, composed of a gripper-blade or other support, gripping-jaws having a hinged or jointed connection therewith to permit side movements, and means for automatically opening the jaws and lifting them over an obstruction, substantially as described.

9. The combination, with a cable-way having gripper-lifting guide-guards and a cable traveling in a tube or tunnel, of a gripper hinged or jointed to a supporting-blade within the tube or tunnel and provided with rollers, whereby the gripper can swing sidewise at the lower end of the blade and also be raised over obstructions, substantially as described.

10. The combination, with a cable-way having gripper-lifting guide-guards and a cable traveling in a tube or tunnel, of a gripper hinged or jointed to the lower portion of a gripper-blade within the tube or tunnel, and provided with rollers attached to a plate which effects the release of the gripper when the latter is raised by the rollers and guide-guards irrespective of the angle at which the gripper stands relative to the gripper-blade, substantially as described.

11. The combination of the gripper-blade, the gripper-jaws, one of which is hinged or jointed to the blade and the other pivoted to the hinged or jointed jaw, and a sliding plate having a cam or incline for closing the jaws, substantially as described.

12. The combination of the gripper-blade, the jaws which grip and release the cable, the sliding plate between the jaws, the slide on the gripper-blade, connected with the sliding plate by a joint, and means for moving the slide on the gripper-blade to adjust the plate between the jaws and effect their opening and closing movements, substantially as described.

13. The combination of the gripper-blade, the opening and closing jaws having a hinged connection therewith, the slide arranged in a recess in the gripper-blade, the moving plate, and the link pivoted to the slide and to the plate, substantially as described.

14. The combination of the gripper-blade having the groove or grooves $a^6$, with the opening and closing jaws having a hinged connection with the blade and the slide $i$, having a projection or projections, $z'$, whereby the slide is retained in position when power is applied to operate the jaws, substantially as described.

15. The combination of the moving plate $j'$, having the rollers $k$, with the hinged jaw $p$ and the pivoted jaw $o$, substantially as described.

16. The combination, with a gripper and the rollers $k$, of the plate or plates $l$ for raising the gripper by contact with guide-guards and preventing it from falling into or between such guards, substantially as described.

17. The combination, with the gripper-blade and the gripping-jaws, of the slide $i$, having the projection $h$, the arm $g$, and the rock-shaft P, substantially as described.

18. The combination of the gripper-blade carrying the gripping-jaws, with the stop or plate $m$ for actuating switch-levers, substantially as described.

19. The combination, with a gripper hinged to the lower end of a gripper-blade, of a movable stop or stops carried by the gripper-blade for engaging and retaining the gripper in vertical line with the blade, substantially as described.

20. The combination, with a gripper hinged to the lower end of a gripper-blade, of a movable stop or stops carried by the gripper-blade for engaging and retaining the gripper in vertical line with the blade or at an angle relative thereto, substantially as described.

21. The combination, with the gripper having a hinged or jointed connection with its blade or other support, of means for swinging the gripper sidewise at curves or bends to adjust its position and insure its proper engagement with the cable, substantially as described.

22. The inclined guide $D^2$, arranged beside the cable at curves or bends for swinging the gripper sidewise to insure its proper engagement with the cable, substantially as described.

23. The combination, with the opening and closing jaws, of two sliding wedges carried by a single jaw, one wedge being adapted to slide inward when the cable is seized, while the other wedge remains in its outer position, substantially as described.

24. The combination, with the opening and closing jaws, of two wedges carried by one jaw, and means for sliding the wedges outward into position to be drawn inward by contact with the cable, substantially as described.

25. The combination of the gripper-jaws, the sliding wedges having projecting pins, and the sliding plate having the double incline, substantially as described.

26. The combination of the gripper-jaws, the wedges, the moving plate carrying rollers, and the latches for holding the wedges in their outer position, substantially as described.

27. The combination of sliding bars U, springs $u'$, supporting-bars Q, springs R, and head S, for easing the strain on the gripper in starting, stopping, turning curves, and returning the gripper-blade to line, substantially as described.

28. The combination of the rotating gripper-head T with the head S, having the arm $S'$, substantially as and for the purpose described.

29. The combination of the head S, having depending arms $S'$, with the rotating head T, hollow head or socket $T'$, and gripper-blade V, arranged substantially as described, whereby the hollow head or socket and blade are capable of detachment when brought out of coincidence with the depending arms, substantially as described.

30. The combination, with the hollow head or socket $T'$ and gripper-blade V, of devices for detachably securing the blade in the head or socket, but permitting such blade to move vertically therein, substantially as described.

31. The combination of the hollow head or socket $T'$, lever $n$, and latch $n'$, with the gripper-blade V, having the pin $n''$, substantially as described.

32. The head S, having the plate $y$, in combination with the rotary head T and pin $y'$, for keeping the gripper in line when the cable is run above ground, substantially as described.

33. The combination of the shaft P, carrying the arm $g$, with the rotating head T and sliding head S, for imparting to the said arm a sliding movement along the shaft, substantially as described.

34. The combination of the arm $g$, shaft P, arm $f$, and link $e$ with the arm $d$ and shaft O, substantially as described.

35. The combination of the shaft O, having the operating-arm $d$, with the arm $c$, lever N, head E, and hand-wheel or crank-shaft D, substantially as described.

36. The head E, having the double cam $a$, in combination with the pin $b$ and lever N, substantially as described.

37. The combination of a cable for propelling cars, arranged longitudinally along the line of a railway-track between the rails, and deflected from a right line at intervals along the line intermediate the terminals thereof, with a device on the car to engage and disengage such cable, and mechanism acting on each deflection of the cable and operating to automatically keep the cable taut and take up slack, and also permit the cable to yield when engaged by said device on the car to propel the latter, substantially as described.

38. The combination of a cable for propelling cars, arranged longitudinally along a railway-track between the rails, and deflected from a right line at intervals along the line between the terminals thereof, with a device on the car to engage and disengage such cable, pulleys 35 and 36, and a weight, 37, engaging each deflection and operating to automatically take up slack in the cable, but permit the latter to yield when engaged by the device on a car to propel the latter, substantially as described.

39. The combination, with a rope or cable of a traction rope railway, of the pulleys or wheels 35 and 36, lever 39, and a resistance acting against the lever, substantially as described.

40. The combination of a gripper-lifting guard, B', with the deflecting wheels 35 and a tightener-wheel, 36, substantially as described.

41. The combination of a cable for propelling cars, deflected from a right line along the line of a railway-track, with means for acting on such deflection and operating to take up slack and keep the cable taut, and a guard, B', for lifting a gripper over the deflection, substantially as described.

42. The combination of the gripper-guard B' with the wheel 27 and cable C', substantially as described.

43. The grooved pulley-wheels 27, located at the end of a main line, or at a point of transfer from one line to another, for bringing the two cables to a common point, substantially as described.

44. The wheels 27, in combination with a wheel, 32, located at one side of the center of a track, for turning a cable and bringing it in position for the gripper, substantially as described.

SAMUEL H. TERRY.

Witnesses:
O. W. BOND,
ALBERT H. ADAMS.